(12) United States Patent
Nakajima (10) Patent No.: US 11,665,240 B2
(45) Date of Patent: May 30, 2023

(54) DATA LINKAGE SYSTEM AND CONTROL SYSTEM

(71) Applicant: KYOCERA Document Solutions Inc., Osaka (JP)

(72) Inventor: Koki Nakajima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/408,660

(22) Filed: Aug. 23, 2021

(65) Prior Publication Data

US 2022/0070263 A1 Mar. 3, 2022

(30) Foreign Application Priority Data

Aug. 26, 2020 (JP) .............................. JP2020-142898

(51) Int. Cl.
*H04L 29/08* (2006.01)
*H04L 12/26* (2006.01)
*H04L 67/12* (2022.01)
*H04L 43/0811* (2022.01)

(52) U.S. Cl.
CPC .......... *H04L 67/12* (2013.01); *H04L 43/0811* (2013.01)

(58) Field of Classification Search
CPC ............................ H04L 67/12; H04L 43/0811
See application file for complete search history.

(56) References Cited

U.S. PATENT DOCUMENTS

| | | | |
|---|---|---|---|
| 2001/0044894 A1* | 11/2001 | Saito | H04L 63/0823 713/156 |
| 2002/0128864 A1* | 9/2002 | Maus | G16H 40/63 705/2 |
| 2007/0250937 A1* | 10/2007 | Ginter | H04N 7/162 726/27 |
| 2009/0319677 A1* | 12/2009 | Masermann | G06Q 10/083 726/4 |
| 2015/0006403 A1* | 1/2015 | Shear | G06Q 20/085 705/57 |
| 2016/0283340 A1* | 9/2016 | Susarla | G06F 3/0689 |

FOREIGN PATENT DOCUMENTS

JP 2015-014954 1/2015

* cited by examiner

*Primary Examiner* — Christopher B Robinson
(74) *Attorney, Agent, or Firm* — Lex IP Meister, PLLC (57) ABSTRACT

A data linkage system includes a data accumulation system that collects and accumulates data held by an information system; and a control service section that manages access information used by the data accumulation system to connect to the information system. The control service section asks the data accumulation system to test the connection to the information system by using the access information managed by the control service section.

2 Claims, 7 Drawing Sheets

FIG. 9

DATA LINKAGE SYSTEM AND CONTROL SYSTEM

INCORPORATION BY REFERENCE

This application is based upon, and claims the benefit of priority from, corresponding Japanese Patent Application No. 2020-142898 filed in the Japan Patent Office on Aug. 26, 2020, the entire contents of which are incorporated herein by reference.

BACKGROUND

Field of the Invention

The disclosure relates to a data linkage system that collects and accumulates data held by an information system and a control system.

Description of Related Art

Typically, there are known techniques to achieve proper data synchronization in different network environments.

SUMMARY

A data linkage system according to the disclosure includes a data accumulation system that collects and accumulates data held by an information system; and a control system that manages access information used by the data accumulation system to connect to the information system, wherein the control system asks the data accumulation system to test the connection to the information system by using the access information managed by the control system.

A data linkage system according to the disclosure includes a data accumulation system that collects and accumulates data held by an information system; and a control system that manages access information used by the data accumulation system to connect to the information system, wherein, when the access information is sent from the information system, the control system updates the access information managed by the control system to the access information sent from the information system.

A control system according to the disclosure manages access information used by a data accumulation system to connect to an information system, the data accumulation system collecting and accumulating data held by the information system, wherein the control system asks the data accumulation system to test connection to the information system by using the access information managed by the control system.

A control system according to the disclosure manages access information used by a data accumulation system to connect to an information system, the data accumulation system collecting and accumulating data held by the information system, wherein when the access information is sent from the information system, the access information managed by the control system is updated to the access information send from the information system.

A system according to the disclosure includes an information system; a data accumulation system that collects and accumulates data held by an information system; and a control system that manages access information used by the data accumulation system to connect to the information system, wherein, the information system sends the updated access information to the control system when the access information managed by the information system is updated, and when the access information is sent from the information system, the control system updates the access information managed by the control system to the access information sent from the information system.

DETAILED DESCRIPTION

Embodiments of the disclosure will now be described with reference to the accompanying drawings.

The configuration of a system according to an embodiment of the disclosure will now be described.

Figure 1:
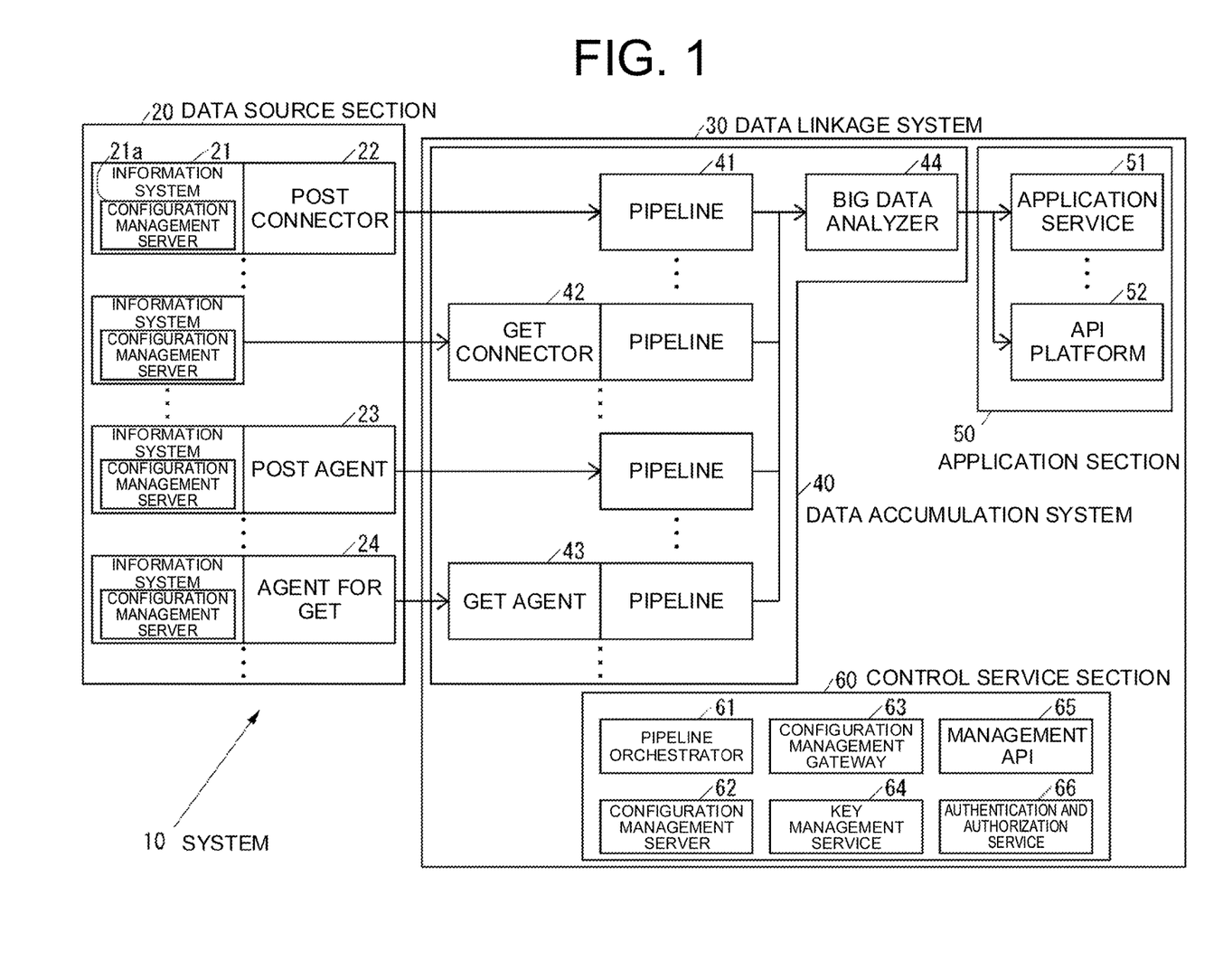
FIG. 1 is a block diagram of a system according to an embodiment of the disclosure.

FIG. 1 is a block diagram of a system 10 according to the present embodiment.

As illustrated in FIG. 1, the system 10 includes a data source section 20 that produces data and a data linkage system 30 that links the data produced by the data source section 20.

The data source section 20 includes an information system 21 that produces data. The information system 21 includes a configuration management server 21a that stores the configuration and settings of the information system 21. The data source section 20 may include at least one information system, in addition to the information system 21. Examples of the information system includes an Internet of things (IoT) system and an intra-company system. The IoT system is a remote management system that remotely manages an image forming apparatus, such as a multifunction peripheral (MFP) or a dedicated printer. The intra-company system is an enterprise resource planning (ERP) system or a production management system.

Each information system may be implemented by a single computer or multiple computers. Each information system may be constructed on a public cloud. The information system may hold files of structured data. The information system may hold files of unstructured data. The information system may hold a database of structured data.

The data source section 20 includes a POST connector 22 serving as a data collection system that acquires a structured data file or an unstructured data file held by the information system and that sends the acquired file to a pipeline of the data linkage system 30, as described below. The data source section 20 may include at least one POST connector having the same configuration as the POST connector 22, in addition to the POST connector 22. The POST connector may be implemented by a computer that constitutes an information system in which the POST connector acquires files. Note that the POST connector is also included in the configuration of the data linkage system 30.

The data source section 20 includes a POST agent 23 serving as a data collection system that acquires structured data from the structured data database held by the information system and that sends the acquired structured data to a pipeline of the data linkage system 30, as described below. The data source section 20 may include at least one POST agent having the same configuration as the POST agent 23, in addition to the POST agent 23. The POST agent may be implemented by a computer that constitutes an information system in which the POST agent acquires structured data. Note that the POST agent is also included in the configuration of the data linkage system 30.

The data source section 20 includes an agent 24 for GET serving as a data collection system that generates structured data for linkage on the basis of the data held by the information system. The data source section 20 may include at least one agent for GET having the same configuration as the agent 24 for GET, in addition to the agent 24 for GET. The agent for GET may be implemented by a computer that constitutes an information system that holds the data that is a source of generation of the structured data for linkage. Note that the agent for GET is also included in the configuration of the data linkage system 30.

The data linkage system 30 includes a data accumulation system 40, and application section 50, and a control service section 60. The data accumulation system 40 accumulates data produced by the data source section 20. The application section 50 uses the data accumulated in the data accumulation system 40. The control service section 60 serves as a control system that executes various types of control for the data accumulation system 40 and the application section 50.

The data accumulation system 40 includes a pipeline 41 that stores the data produced by the data source section 20. The data accumulation system 40 may include at least one pipeline, in addition to the pipeline 41. Since the data configuration in the information system may be different for each information system, the data accumulation system 40 is basically provided with a pipeline for each information system. Each pipeline may be implemented by a single computer or multiple computers.

The data accumulation system 40 includes a GET connector 42 serving as a data collection system that acquires a structured data file or an unstructured data file held by an information system and links the acquired file to a pipeline. The data accumulation system 40 may include at least one GET connector having the same configuration as the GET connector 42, in addition to the GET connector 42. The GET connector may be implemented by a computer that constitutes the pipeline to which the GET connector links a file.

Note that, in the system 10, an information system of the data source section 20 is provided with a POST connector when the information system does not support the acquisition of a structured data file or an unstructured data file from the data accumulation system 40. In contrast, in the system 10, an information system of the data accumulation system 40 is provided with a GET connector when the information system supports the acquisition of a structured data file or an unstructured data file from the data accumulation system 40.

The data accumulation system 40 includes a GET agent 43 serving as a data collection system that acquires structured data generated by the agent for GET and links the acquired structured data to a pipeline. The data accumulation system 40 may include at least one GET agent having the same configuration as the GET agent 43, in addition to the GET agent 43. The GET agent may be implemented by a computer that constitutes the pipeline to which the GET agent links the structured data.

Note that, in the system 10, an information system of the data source section 20 is provided with a POST agent when the information system does not support the acquisition of structured data from the data accumulation system 40. In contrast, in the system 10, an information system of the data source section 20 is provided with an agent for GET and the data accumulation system 40 is provided with a GET agent when the information system supports the acquisition of structured data from the data accumulation system 40.

The data accumulation system 40 includes a big data analyzer 44 serving as a data conversion system that executes final conversion processing as data conversion processing for converting the data accumulated by multiple pipelines into a form that can be searched or aggregated in a query language, such as a database language, e.g., SQL. The big data analyzer 44 can also search or aggregate data for which the final conversion processing has been executed in response to a search request or an aggregation request from the application section 50. The big data analyzer 44 may be implemented by a single computer or multiple computers.

The final conversion processing may include data integration processing for integrating data of multiple information systems as data conversion processing. When the system 10 includes, as information systems, a remote management system located in Asia to remotely manage a large number of image forming apparatuses located in Asia, a remote management system located in Europe to remotely manage a large number of image forming apparatuses located in Europe, and a remote management system located in the United States to remotely manage a large number of image forming apparatuses located in the United States, each of these three remote management systems includes a device management table for managing the image forming apparatuses managed by the remote management system. The device management table is information indicating various types of information of the image forming apparatuses in association with IDs assigned to the respective image forming apparatuses. Here, since each of the three remote management systems has its own device management table, there is a possibility that same IDs are assigned to different image forming apparatuses among the device management tables of the three remote management systems. Therefore, when the device management tables of the three remote management systems are integrated to generate one device management table, the big data analyzer 44 reassigns the IDs of the image forming apparatuses so as not to cause duplication.

The application section 50 includes an application service 51 that uses the data managed by the big data analyzer 44 to execute a specific operation instructed by the user, such as display of data or analysis of data. The application section 50 may include at least one application service in addition to the application service 51. Each application service may be implemented by a single computer or multiple computers.

The application service is, for example, a business intelligence (BI) tool, software as a service (SaaS) server, or the like.

The application section 50 includes an API platform 52 that provides an application program interface (API) that executes a specific operation by using the data managed by the big data analyzer 44. The API platform 52 may be implemented by a single computer or multiple computers. The API provided by the API platform 52 may be called from a system external to the system 10, such as a BI tool, a SaaS server, or the like, or from an application service of the application section 50. The APIs provided by the API platform 52 are APIs for retrieving data based on data accumulated by the data accumulation system 40 from the data accumulation system 40. Examples of the APIs provided by the API platform 52 include: an API for transmitting data on the remaining amount of consumables collected from the image forming apparatuses by a remote management system to an external consumables order system outside of the system 10, which orders the consumables, such as a toner for the image forming apparatuses, when the remaining amount of the consumables is not more than a particular amount; an API for transmitting various types of data collected from the image forming apparatuses by a remote management system to an external failure prediction system outside of the system 10, which predicts a failure of the image forming apparatus; an API for transmitting counter information indicating the number of printed sheets collected from the image forming apparatuses by a remote management system to an external system outside of the system 10; an API for transmitting data indicating a usage status of the system 10 by a user of the system 10 to an external system outside of the system 10; and an API for accepting a search query for acquiring optional data on the basis of the data managed by the system 10.

The control service section 60 includes a pipeline orchestrator 61 serving as a processing monitoring system that monitors the processing at each stage to be carried out for the data in the data source section 20, the data accumulation system 40, and the application section 50. The pipeline orchestrator 61 may be implemented by a single computer or multiple computers.

The control service section 60 includes a configuration management server 62 that stores the configuration and settings of the data accumulation system 40 and automatically executes deployment as necessary. The configuration management server 62 may be implemented by a single computer or multiple computers.

The control service section 60 includes a configuration management gateway 63 connected to the configuration management server of the information system and collects information for detecting a change in the configuration related to the database or unstructured data in the information system, that is, a change in the data configuration in the information system. The configuration management gateway 63 may be implemented by a single computer or multiple computers.

The control service section 60 includes a key management service 64 that encrypts and stores security information such as key information and connection character strings required for linking systems such as information systems. The key management service 64 may be implemented by a single computer or multiple computers.

The control service section 60 includes a management API 65 that accepts requests from the data accumulation system 40 and the application section 50. The management API 65 may be implemented by a single computer or multiple computers.

The control service section 60 includes an authentication and authorization service 66 that authenticates and authorizes an application services of the application section 50. The authentication and authorization service 66 may be implemented by a single computer or multiple computers. The authentication and authorization service 66 can confirm, for example, whether or not an application service is authorized to request the update of the data of an information system accumulated in the data accumulation system 40.

Figure 2:
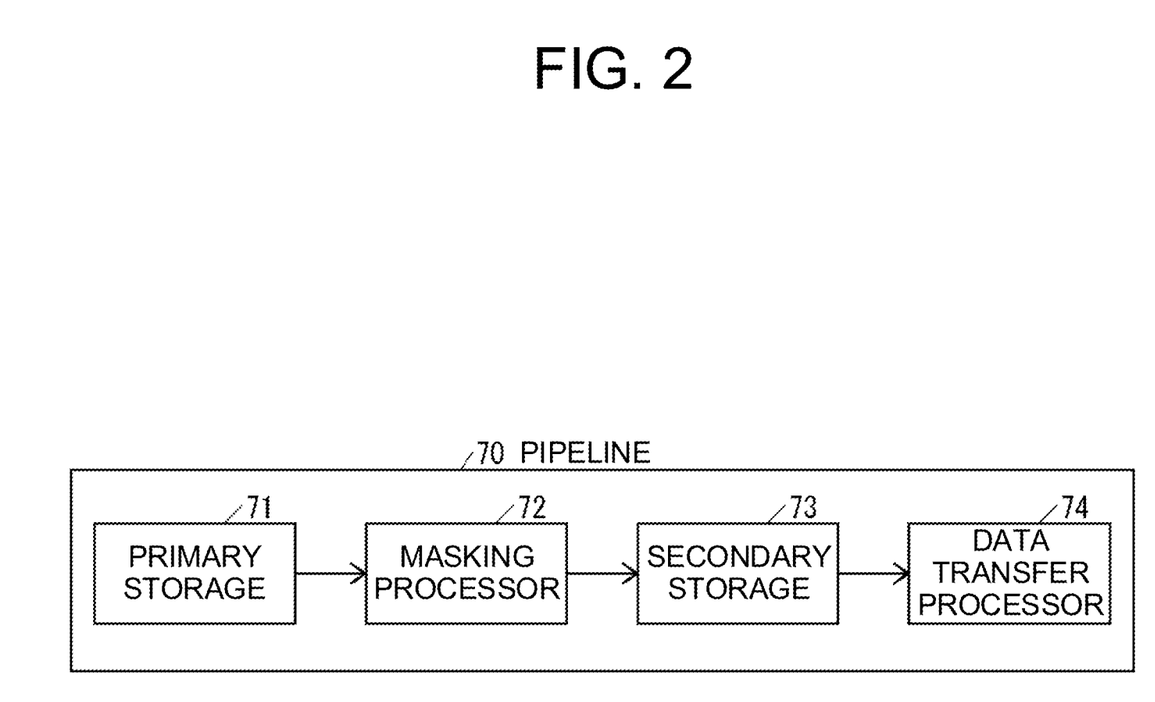
FIG. 2 is a block diagram of a pipeline provided in the data accumulation system illustrated in FIG. 1.

FIG. 2 is a block diagram of a pipeline 70 of the data accumulation system 40.

As illustrated in FIG. 2, the pipeline 70 includes a primary storage 71, a masking processor 72, a secondary storage 73, and a data transfer processor 74. The primary storage 71 has a storage area for storing data received from a POST connector, a POST agent, a GET connector, or a GET agent. The masking processor 72 executes masking processing for data related to privacy such as personal information of a user of an information system in the data stored in the primary storage 71. The secondary storage 73 has a storage area for accumulating data subjected to masking processing by the masking processor 72. The data transfer processor 74 executes data transfer processing for transferring data stored in the secondary storage 73 to the big data analyzer 44 (see FIG. 1). Note that the reason why the primary storage 71 is provided is that in the data processing, if the processing fails in a step after the step of storing the data in the primary storage 71, such as steps of masking processing and a data transfer, re-execution of the failed processing using the data stored in the primary storage 71 is made possible without retransmitting the data from the data source section 20 to the data linkage system 30, which has a high network communication cost.

Figure 3:
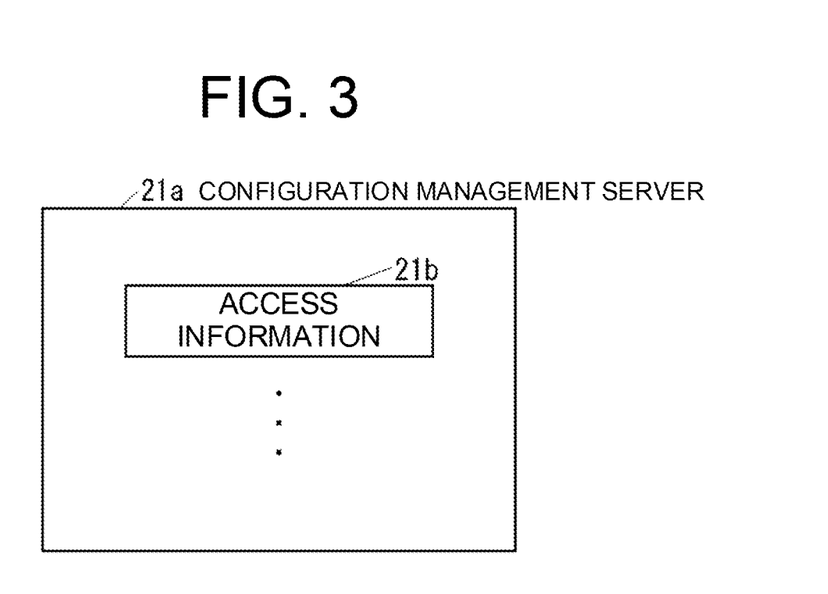
FIG. 3 illustrates information managed by a configuration management server illustrated in FIG. 1.

FIG. 3 illustrates the information managed by the configuration management server 21a.

As illustrated in FIG. 3, the configuration management server 21a manages access information 21b for connecting the pipeline 41 to the information system 21. The configuration management server 21a may manage at least one piece of access information in addition to the access information 21b. Examples of the access information includes a destination and credentials for connecting to the database of an information system, a destination and credentials for connecting to the storage of an information system, credentials for connecting to the cloud service of an information system, a certificate of an information system, and an encryption key of an information system. Examples of credentials include a combination of an ID and a password, a combination of an account name and a password, and an access key. Access information is updated at regular intervals because it usually has an expiration period.

Figure 4:
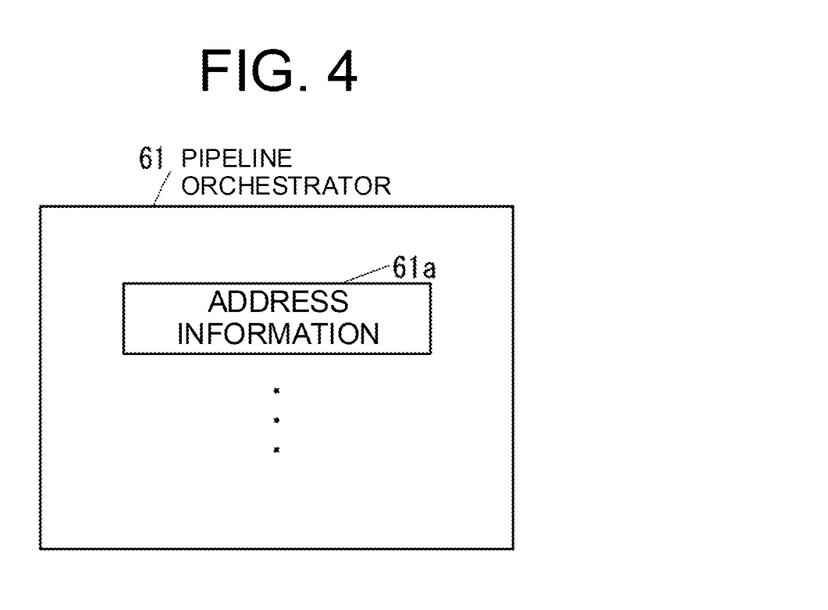
FIG. 4 illustrates information managed by the pipeline orchestrator in FIG. 1.

FIG. 4 illustrates the information managed by the pipeline orchestrator 61.

As illustrated in FIG. 4, the pipeline orchestrator 61 can manage address information 61a indicating the address of the destination of an e-mail asking for the update of access information. The pipeline orchestrator 61 can manage at least one pieces of destination information in addition to the address information 61a. The pipeline orchestrator 61 can manage address information for each information system. The address information includes, for example, an address of an administrator of the data linkage system 30, and an address of an administrator of an information system. The address information can be set, for example, by an administrator of the data linkage system 30.

Figure 5:
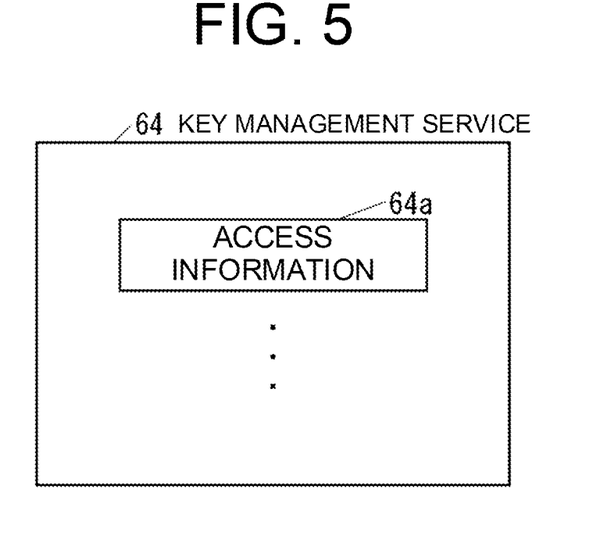
FIG. 5 illustrates information managed by a key management service illustrated in FIG. 1.

FIG. 5 illustrates information managed by the key management service 64.

As illustrated in FIG. 5, the key management service 64 manages access information 64*a* as security information for connecting a pipeline to an information system. The key management service 64 may manage at least one pieces of access information as security information, in addition to the access information 64*a*.

The operation of the system 10 when a pipeline retrieves data managed by an information system.

Figure 6:
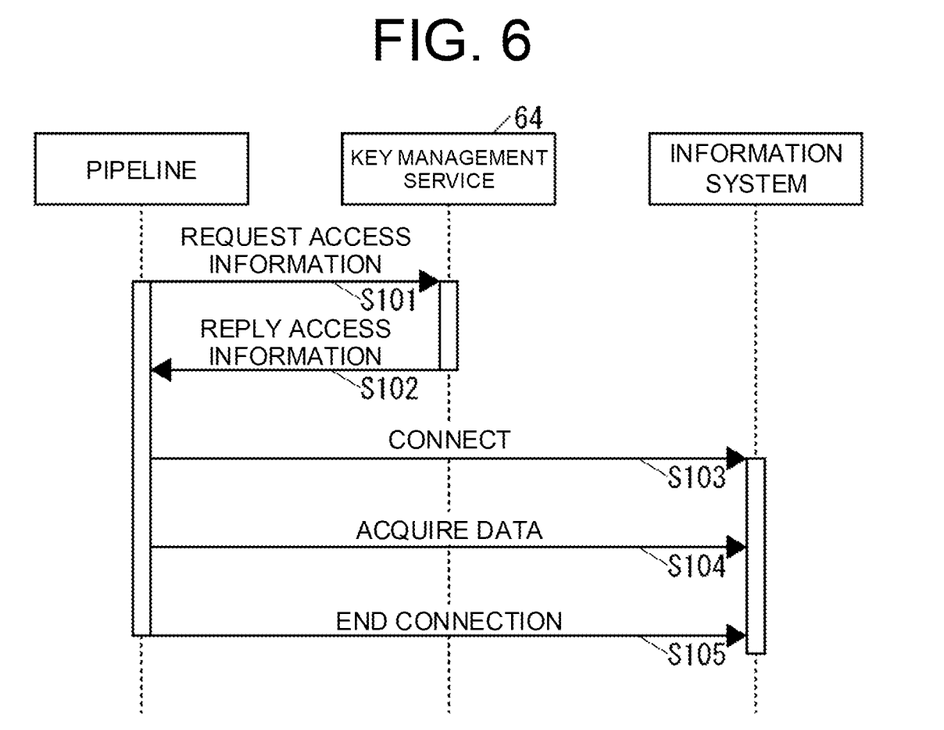
FIG. 6 is a sequence diagram of the operation of the system illustrated in FIG. 1 when the pipeline acquires data managed by the information system.

FIG. 6 is a sequence diagram of the operation of the system 10 when a pipeline retrieves data managed by an information system.

The pipeline executes the operations illustrated in FIG. 6 at specific intervals, for example, once every hour, once every half day, and so on. The intervals of execution of the operation illustrated in FIG. 6 by the pipeline can be set, for example, by an administrator of the data linkage system 30.

As illustrated in FIG. 6, the pipeline requests access information managed by the key management service 64 to the key management service 64 (step S101).

Upon receiving the request in step S101, the key management service 64 responds to the pipeline with access information for the pipeline which is the requester in step S101 among the pieces of access information managed by the key management service 64 (step S102).

Upon receiving the response in step S102, the pipeline uses the access information from the key management service 64 received in step S102 to connect to the information system corresponding to the access information (step S103). Here, the pipeline may connect to an information system via a POST connector, a POST agent, a GET connector, an agent for GET, or a GET agent. The information system uses the access information on the configuration management server of the information system and the access information sent from the pipeline in step S103, to determine whether or not to connect to the pipeline. That is, when the access information on the configuration management server of the information system matches the access information sent from the pipeline in step S103, the information system authorizes connection to the pipeline; and when the access information on the configuration management server of the information system does not match the access information sent from the pipeline in step S103, the information system does not authorize connection to the pipeline.

After the completion of the connection in step S103, the pipeline retrieves the data managed by the information system from the information system (step S104).

After the processing in step S104, the pipeline terminates the connection to the information system (step S105).

The operation of the system 10 when the pipeline orchestrator 61 periodically checks the validity of the access information managed by the key management service 64 will now be described.

Figure 7:
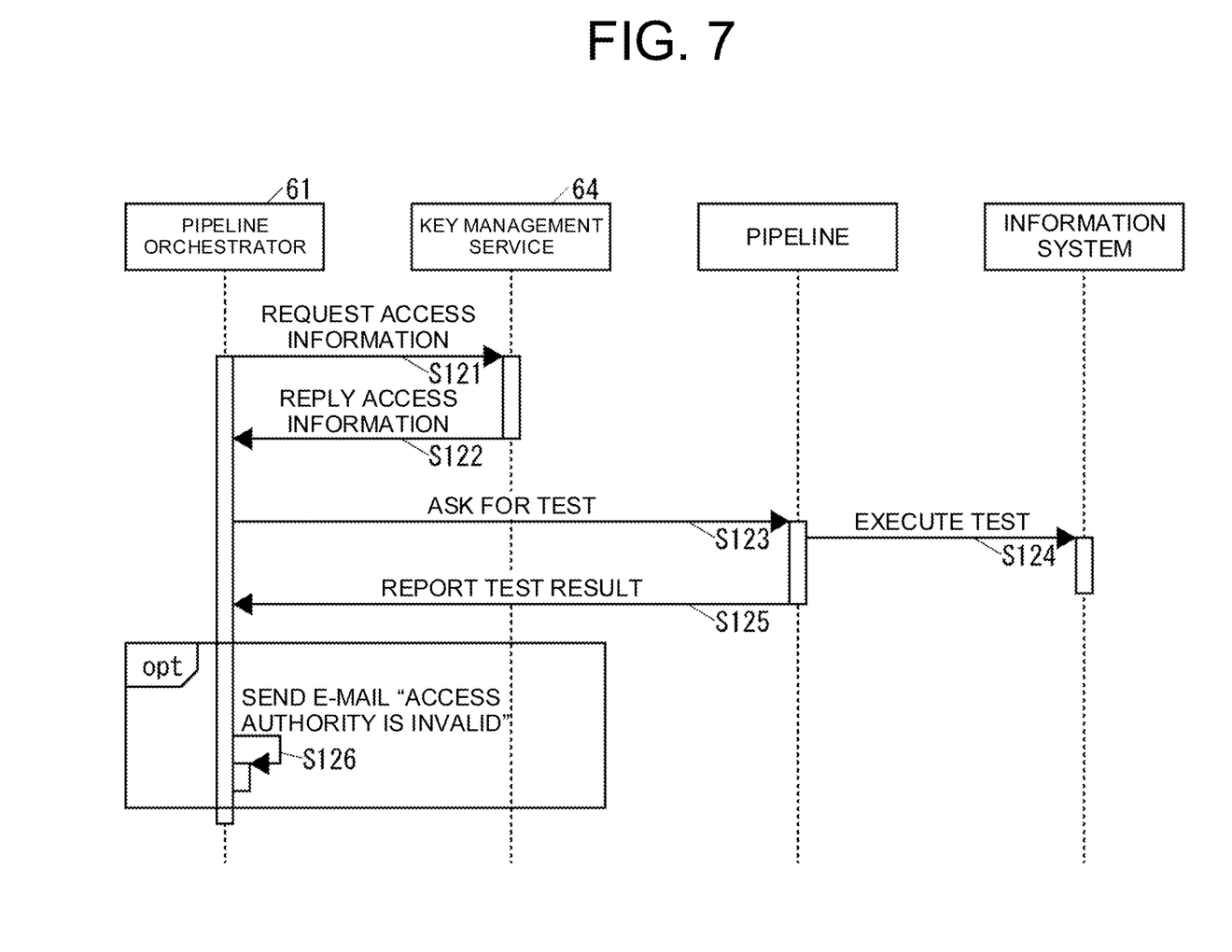
FIG. 7 is a sequence diagram of the operation of the system illustrated in FIG. 1 when the pipeline orchestrator periodically checks the validity of the access information managed by the key management service.

FIG. 7 is a sequence diagram of the operation of the system 10 when the pipeline orchestrator 61 periodically checks the validity of the access information managed by the key management service 64.

The pipeline orchestrator 61 executes the operations illustrated in FIG. 7 at specific intervals, for example, once every hour, once every half day, and so on. The intervals for the execution of the operations illustrated in FIG. 7 by the pipeline orchestrator 61 can be set, for example, by an administrator of the data linkage system 30. If the access information is invalid, data acquisition by the pipeline using the access information will fail. Therefore, it is preferable from the viewpoint of early detection of a defect in the operation of the data linkage system 30 that the execution period of the operation illustrated in FIG. 7 by the pipeline orchestrator 61 be shorter than the period of data acquisition by the pipeline using corresponding access information.

As illustrated in FIG. 7, the pipeline orchestrator 61 requests the key management service 64 for access information managed by the key management service 64 (step S121).

Upon receiving the request in step S121, the key management service 64 responds to the pipeline orchestrator 61 with the access information managed by the key management service 64 (step S122).

Upon receiving the response in step S122, the pipeline orchestrator 61 asks the pipeline for a validity test of the access information sent from the key management service 64 in step S122 (step S123). Here, the pipeline orchestrator 61 specifies the pipeline corresponding to the information system corresponding to the access information subjected to the validity test as the requester in step S123.

Upon being asked in step S123, the pipeline uses the access information included in the content being asked in step S123 to execute a validity test of the access information for the information system corresponding to the access information (step S124). Here, a preferred method of the test is one other than the method in which the pipeline actually acquires data managed by the target information system as in the operation illustrated in FIG. 6, e.g., a method in which the pipeline checks the information system corresponding to the access information for connection by using the access information included in the content being asked in step S123. The information system uses the access information on the configuration management server of the information system and the access information sent by the pipeline in step S124 to determine whether to connect to the pipeline. That is, the information system authorizes the connection to the pipeline when the access information on the configuration management server of the information system matches the access information sent from the pipeline in step S124, and does not authorize the connection to the pipeline when the access information on the configuration management server of the information system does not match the access information sent from the pipeline in step S124.

After the processing in step S124, the pipeline notifies the pipeline orchestrator 61 of the results of the test in step S124 (step S125).

If the test results notified in step S125 indicates that the connection between the pipeline and the information system was not authorized, that is, the test results indicated that the access information is invalid, the pipeline orchestrator 61 sends an e-mail to the destination indicated by the address information to ask for the update of the access information (step S126). Therefore, as described below, the access information managed by the key management service 64 can be updated, for example, in response to an instruction to the pipeline orchestrator 61 by an administrator of the information system. Note that the pipeline orchestrator 61 may include specific details of problems, such as the access information being expired, in the e-mail sent in step S126.

Described now is the operation of the data linkage system 30 when the access information managed by the key management service 64 is updated in response to an instruction to the pipeline orchestrator 61 by an administrator of the information system.

Figure 8:
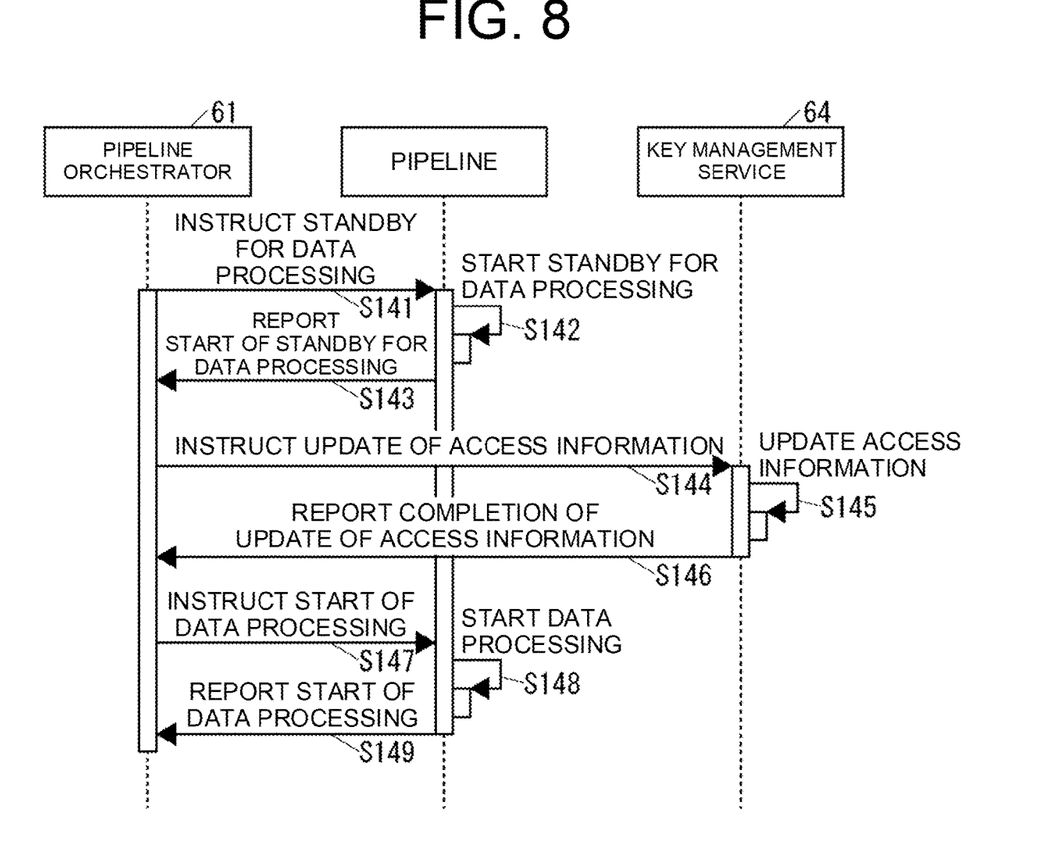
FIG. 8 is a sequence diagram of the operation of the data linkage system illustrated in FIG. 1 when the access information managed by the key management service is updated in response to an instruction to the pipeline orchestrator by an administrator of the information system.

FIG. 8 is a sequence diagram of the operation of the data linkage system 30 when the access information managed by the key management service 64 is updated in response to an instruction to the pipeline orchestrator 61 by an administrator of the information system.

The administrator of the information system can instruct the pipeline orchestrator 61, for example, via a computer (not illustrated) to update the access information for the information system among the pieces of access information managed by the key management service 64.

Upon being instructed to update the access information, the pipeline orchestrator 61 instructs the pipeline corresponding to the information system corresponding to the access information to standby for processing of the data produced by the data source section 20 (step S141), as illustrated in FIG. 8.

Upon receiving the instruction in step S141, the pipeline enters standby for the processing of the data produced by the data source section 20 (step S142) and notifies the pipeline orchestrator 61 about entering standby for the processing of the data produced by the data source section 20 (step S143).

Upon receiving the notification in step S143, the pipeline orchestrator 61 instructs the key management service 64 to update the access information instructed to be updated (step S144). The pipeline orchestrator 61 includes the new access information, which is the updated access information, in the instruction in step S144.

Upon receiving the instruction in step S144, the key management service 64 updates the access information that is instructed to be updated in step S144 among the pieces of access information managed by the key management service 64 to the new access information included in the instruction in step S144 (step S145).

After the processing in step S145, the key management service 64 notifies the pipeline orchestrator 61 of the completion of the update of the access information (step S146).

Upon receiving the notification in step S146, the pipeline orchestrator 61 instructs the start of the processing of the data produced by the data source section 20 to the pipeline instructed in step S141 to standby for the processing of the data produced by the data source section 20 (step S147).

Upon receiving the instructions in step S147, the pipeline starts the processing of the data produced by the data source section 20 (step S148) and notifies the pipeline orchestrator 61 of the start of the processing of the data produced by the data source section 20 (step S149).

In the above, described is a case in which the access information managed by the key management service 64 is updated in response to an instruction to the pipeline orchestrator 61 by an administrator of the information system. However, the access information managed by the key management service 64 may be updated in response to an instruction by someone other than an administrator of the information system, such as an administrator of the data linkage system 30.

Described now is the operation of the system 10 when the access information managed by the key management service 64 is updated in coordination with the access information on the configuration management server of the information system.

Figure 9:
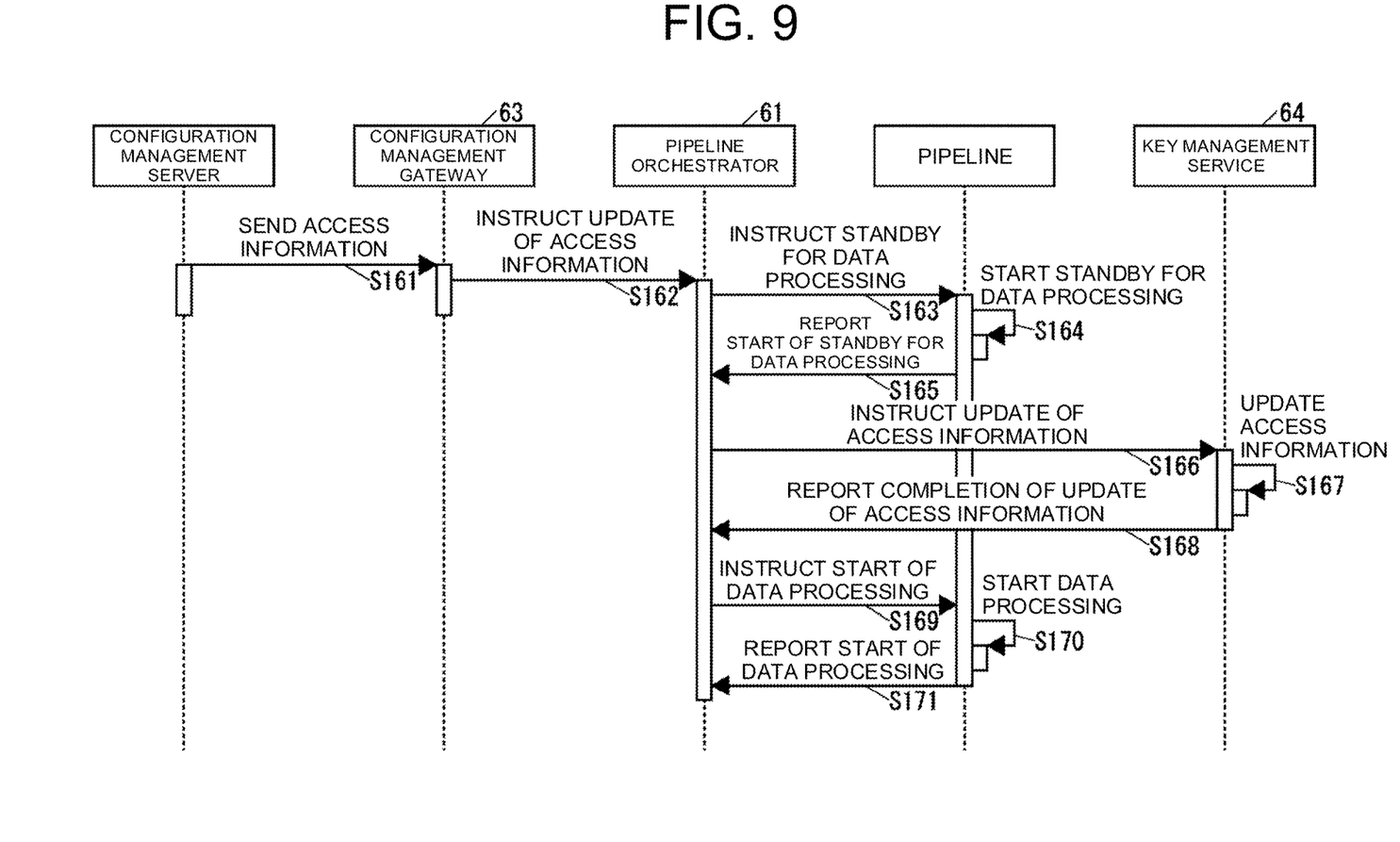
FIG. 9 is a sequence diagram of the operation of the system illustrated in FIG. 1 when the access information managed by the key management service is updated in coordination with access information on the configuration management server of the information system.

FIG. 9 is a sequence diagram of the operation of the system 10 when the access information managed by the key management service 64 is updated in coordination with the access information on the configuration management server of the information system.

An administrator of an information system can update the access information on the configuration management server of the information system, for example, via a computer (not illustrated).

Upon updating the access information managed by the configuration management server, the configuration management server sends the updated access information to the configuration management gateway 63 (step S161), as illustrated in FIG. 9.

Upon receiving the access information sent from the configuration management server in step S161, the configuration management gateway 63 instructs the pipeline orchestrator 61 to update the access information (step S162). The configuration management gateway 63 includes the new access information sent from the configuration management server in step S161 in the instruction in step S162.

Upon being instructed to update the access information in step S162, the pipeline orchestrator 61 instructs the pipeline corresponding to the information system corresponding to the access information to standby for the processing of the data produced by the data source section 20 (step S163).

Upon receiving the instruction in step S163, the pipeline enters standby for the processing of the data produced by the data source section 20 (step S164) and notifies the pipeline orchestrator 61 of the entering of standby for the processing of the data produced by the data source section 20 (step S165).

Upon receiving the notification in step S165, the pipeline orchestrator 61 instructs the key management service 64 to update the access information instructed to be updated in step S162 (step S166). The pipeline orchestrator 61 includes the new access information included in the instruction in step S162, in the instruction in step S166.

Upon receiving the instruction in step S166, the key management service 64 updates the access information instructed to be updated in step S166 among the pieces of access information managed by the key management service 64 to the new access information included in the instruction in step S166 (step S167).

After the processing in step S167, the key management service 64 notifies the pipeline orchestrator 61 of the completion of the update of the access information (step S168).

Upon receiving the notification in step S168, the pipeline orchestrator 61 instructs the start of the processing of the data produced by the data source section 20 to the pipeline instructed in step S163 to standby for the processing of the data produced by the data source section 20 (step S169).

Upon receiving the instructions in step S169, the pipeline starts the processing of the data produced by the data source section 20 (step S170) and notifies the pipeline orchestrator 61 of the start of the processing of the data produced by the data source section 20 (step S171).

As described above, since the data accumulation system 40 executes a test of the connection to the information system by using the access information managed by the control service section 60 (step S124), the data linkage system 30 can detect a change in the access information through the test executed by the data accumulation system 40. That is, the data linkage system 30 can respond to a change in the access information for connection to the information system.

In the system 10, when the access information managed by the information system is updated, the information system sends the updated access information to the control service section 60 (step S161), and when the access information is sent from the information system to the control service section 60, the access information managed by the control service section 60 is updated to the access information sent from the information system to the control service section 60 (step S167). Therefore, the system 10 can respond to a change in the access information for connection to the information system.

The data linkage system 30 can increase the possibility of the access information managed by the key management service 64 also being appropriately updated when the access information managed by the configuration management server of the information system is updated, so that the possibility of failure of the collection of data held by the information system can be reduced.

What is claimed is:

1. A data linkage system comprising:
a data accumulation system that collects and accumulates data held by an information system; and
a control system that manages, as encrypted information, security information required for linking the information system, the security information including access information which the data accumulation system transmits to the information system to connect to the information system,
wherein the control system manages the access information in such a manner that the control system periodically checks whether the access information managed as encrypted information by the control system is valid for the information system, by asking the data accumulation system to connect to the information system using the access information managed by the control system, the control system providing the data accumulation system with the access information to be subjected to the check of validity thereof when asking connection to the information system, and determining the validity of the provided access information in accordance with whether the data accumulation system establishes connection to the information system by transmitting the provided access information to the information system.

2. A data linkage system comprising:
a data accumulation system that collects and accumulates data held by an information system; and
a control system that manages, as encrypted information, security information required for linking the information system, the security information including access information which the data accumulation system transmits to the information system to connect to the information system,
wherein the control system manages the access information in such a manner that the control system periodically checks whether the access information managed as encrypted information by the control system is valid for the information system, by asking the data accumulation system to connect to the information system using the access information managed by the control system, the control system providing the data accumulation system with the access information to be subjected to the check of validity thereof when asking connection to the information system, and determining the validity of the provided access information in accordance with whether the data accumulation system establishes connection to the information system by transmitting the provided access information to the information system.

* * * * *